May 4, 1954     S. E. URBAN ET AL     2,677,635
METHOD OF ADHERING WATERPROOF SHEET PLASTIC TO
A POROUS SURFACE AND ARTICLE PRODUCED THEREBY
Filed March 29, 1951
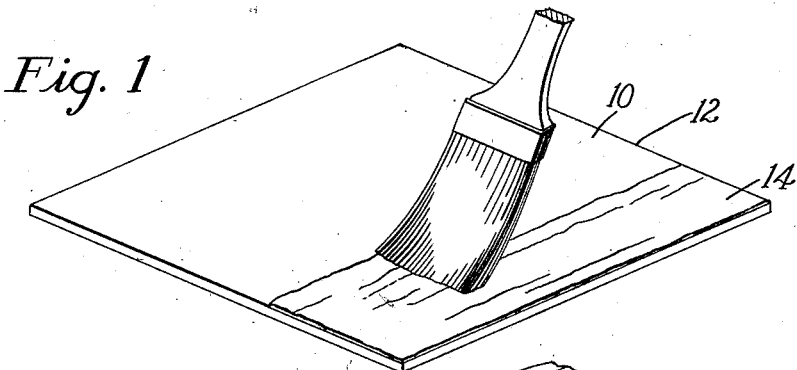
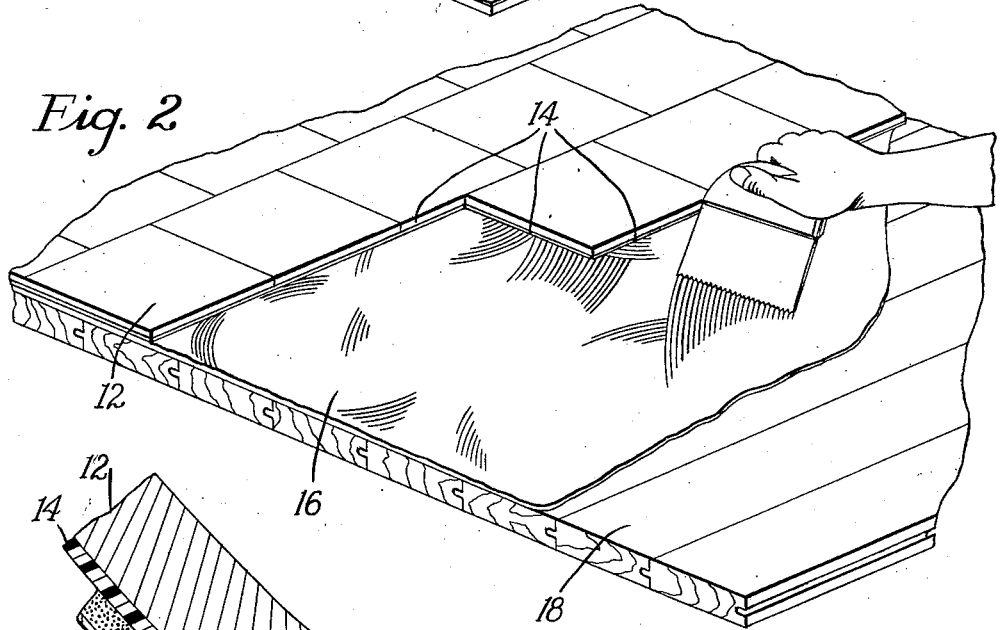
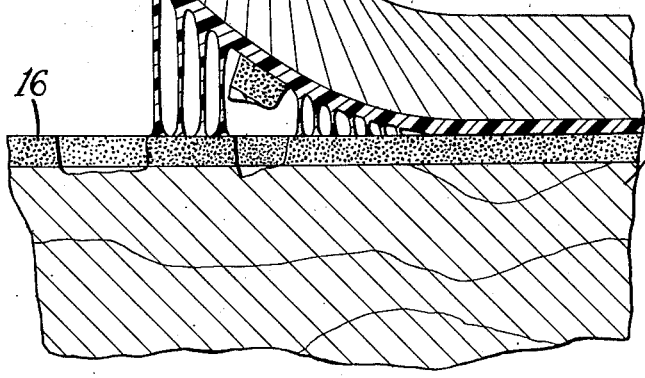
*Inventors*
Stephen E. Urban
Thomas C. Morris
Eric C. Johnson
By their Attorney Patented May 4, 1954

2,677,635

UNITED STATES PATENT OFFICE 2,677,635

METHOD OF ADHERING WATERPROOF SHEET PLASTIC TO A POROUS SURFACE AND ARTICLE PRODUCED THEREBY

Stephen E. Urban, Melrose, Thomas C. Morris, Lexington, and Eric C. Johnson, Somerville, Mass., assignors to B. B. Chemical Co., Boston, Mass., a corporation of Massachusetts Application March 29, 1951, Serial No. 218,182

10 Claims. (Cl. 154—139)

This invention relates to the bonding of sheet plastic material to a base and to a coated plastic sheet material for such bonding.

Plastic sheet materials have enjoyed increasing popularity for floor and wall coverings because of their resistance to scuffing and wear and their nonstaining and nonspotting characteristics. A factor which has hindered even greater use of plastic sheet materials has been necessary changes in application technique from that heretofore known to artisans for use in laying linoleum, oil cloth or wall paper to special adhesives and techniques for securing plastic sheet materials.

Standardized procedures have been developed for laying linoleum and linoleum tile. Special linoleum cements are applied with a comb spreader to the surface to be covered, as large an area being coated with cement as can conveniently be covered with linoleums or linoleum tile before the first applied cement loses adhesiveness. Rapid laying and uniform bonding of linoleum require good judgment which can only be developed through familiarity with the cements, spreaders and other factors involved.

Cements preferred for laying linoleum or wall covering are water-containing compositions such as lignin pastes, casein glues, animal glues, etc. These compositions are cheap, easy to apply, free from toxic or hazardous vapors and form adequate bonds to linoleum.

These cements, while ideal for laying linoleum and thoroughly understood by artisans, do not form strong bonds to the new plastic sheet materials. In securing the new plastic sheet materials, it has been necessary to resort to solvent type or other special adhesives. The procedures required for applying sheet plastic with these different adhesives are foreign to the man familiar with laying linoleum; and as a result the application of plastic sheet materials has been slow and costly and the results not always as good as might be desired.

It is a feature of the present invention to provide a plastic sheet material having a surface layer readily bonded by conventional water base adhesives.

It is an additional feature to provide a method for securing plastic sheet material to a porous surface by conventional procedures employed for bonding linoleum or the like and using a water base adhesive.

We have made the remarkable discovery that plastic sheet material may be bonded to wood or other porous surfaces by providing on a surface of the plastic sheet a layer of an intimate mixture of a butadiene acrylonitrile copolymer rubber and a highly polar resin containing a hydroxy or carboxy group and joining the surface layer to a wood or other porous surface by water base adhesives such as animal or vegetable glue, cereal paste, or lignin type adhesives.

The invention will be further described in connection with the drawings, forming part of the present disclosure, wherein Fig. 1 is an angular view illustrating the application of a butadiene acrylonitrile copolymer rubber-resin layer on a surface of a plastic sheet;

Fig. 2 is an angular view illustrating the method of bonding a plastic sheet to a wooden flooring; and Fig. 3 is an elevational view showing a plastic sheet bonded to a wooden flooring and illustrating the character of the bond when subjected to disrupting stresses.

In the prior application of two of us, Thomas C. Morris and Eric C. Johnson, Serial Number 687,700, filed August 1, 1946, now Patent No. 2,572,877, granted October 30, 1951, there is disclosed a method for bonding vinyl resin sheets to other surfaces through a special adhesive action of butadiene acrylonitrile copolymer latices toward plasticized vinyl resins. As therein disclosed, firmly adherent coatings may be formed on ester-plasticized vinyl resin sheets by applying butadiene acrylonitrile copolymer latex and coagulating the latex solids on the vinyl resin surface.

In the further application of two of us, Thomas C. Morris and Eric C. Johnson, Serial Number 18,708, of April 2, 1948, now Patent No. 2,572,879, granted October 30, 1951, there is disclosed the forming of firmly adherent coatings on ester plasticized plastic sheets including cellulose esters and ethers, rubber hydrochloride, polystyrene, etc.

In accordance with the present invention, a surface 10 of an ester plasticized vinyl resin or other plastic body 12 is provided with a strongly adherent coating 14 of an intimate mixture of a butadiene acrylonitrile copolymer rubber and a highly polar, preferably water insoluble, resin containing hydroxy or carboxy groups, which exhibits an unusual and unexpected property of forming strong bonds with water base adhesives. It is preferred that this coating be deposited from an aqueous medium to avoid the harmful effects of solvent containing compositions on vinyl resins or other plastics, although for special problems, solvent containing coatings may be used. A blend of a butadiene acrylonitrile copolymer latex and an aqueous dispersion of the resin or resins has been found effective in forming strongly adherent coatings.

The applied coating 14 is dried to form a tough film or layer comprising the copolymer rubber and the resin or resins. This tough film or layer 14 comprising water-repellent butadiene acrylonitrile rubber and water insoluble resin is then pressed against a layer 16 of water base adhesive on a surface 18 to be covered with the sheet material. The water base adhesive forms, on hardening, a strong bond with the copolymer rubber and resin layer 14. This bond is sufficient for example when a commercial water base lignin linoleum cement is used for bonding a coated vinyl resin tile to wood flooring, that when forcibly separated as shown in Fig. 3, portions of the surface of the wood 18 comes along with the resin tile 12.

The simplicity of the initial butadiene acrylonitrile copolymer rubber and resin coating makes the process adaptable for wide use. Thus where no solvent is used, the coating may be applied to the thinnest of vinyl resin sheets, i. e., as thin as two mils or less without distortion or other harmful effects. On the other hand, the bond formed is satisfactory for very difficult applications such as in the bonding of relatively thick floor tiles.

The plastic material adhered may be any of the known waterproof vinyl resins including polyvinyl acetate, polyvinyl chloride, copolymerized vinyl acetate and vinyl chloride, polyvinyl acetal, copolymerized vinyl chloride and vinylidene chloride, polymerized vinylidene chloride, or other suitable vinyl resin. Mixtures and copolymers of these and other vinyl resins are also contemplated. A preferred vinyl resin sheet comprises a polymer of vinyl chloride alone or with up to 20% and preferably from 5% to 15% of vinyl acetate or vinylidene chloride. Other waterproof plastic sheet materials include cellulose ester and other plastics such as cellulose nitrate, cellulose acetate, and ethyl cellulose These plastic sheet materials ordinarily contain from 10% to 50% of a plasticizer. Suitable plasticizers for plastics of the class adhered according to the present invention are the ester plasticizers such as dibutyl phthalate, dibutyl sebacate, tricresyl phosphate, and dioctyl phthalate.

As aqueous dispersions of butadiene-acrylonitrile copolymer, there may be used various commercial latices. "Perbunan G" and "Perbunan H," produced by Standard Oil Company of New Jersey, have been found useful and are emulsion copolymers of butadiene and acrylonitrile, the acrylonitrile constituting about 25% of the copolymer. Type "G" comprises about 50.1% copolymer solids and type "H" comprises about 55% copolymer solids. Other latices, such as "Hycar OR-15" and "Hycar OR-25," which are produced by the B. F. Goodrich Chemical Company of Akron, Ohio, and are also emulsion copolymers of butadiene and acrylonitrile, may be used according to the present invention.

The modified butadiene-acrylonitrile copolymer latex for adhering plastic sheet materials, according to the present invention, may comprise known agents which thicken and improve the spreading of the latex on the plastic sheet material. Suitable agents for this purpose include hydrophilic colloidal thickening agents such as ammonia-solubilized casein, Wilkinite and bentonite.

The latex employed is preferably an emulsion copolymer of butadiene and acrylonitrile in which the acrylonitrile is about 10% to about 50%, suitably about 25% to 33% by weight of the copolymer. Suitably the latex will comprise about 40% or more of the copolymer solids. Optionally, agents, e. g., sulphur, zinc oxide, and suitable accelerators, such as Butyl Zimate (zinc dibutyl dithiocarbamate) or Butyl 8 (a rubber accelerator of the dithiocarbamate type), for vulcanizing the copolymer, may be included in the latex or introduced into the emulsion immediately prior to use.

Solutions of butadiene acrylonitrile copolymers for use in another form of the present invention may comprise from 10% to 30%, preferably 15% by weight of the copolymers, in a volatile organic solvent, preferably a higher boiling ketone such as methyl ethyl ketone.

The resin component of the coating composition may comprise one or more resins in aqueous dispersion, for use with latex, or in organic solvent solution for use with solutions of butadiene acrylonitrile copolymer. Suitable resins for use in the coating composition are the highly polar resins containing hydroxy groups or carboxy groups. A preferred resin dispersion may be the commercially available aqueous dispersion of "Vinsol resin." "Vinsol" is a hard, brittle, dark colored resin containing phenolic groups, aldehyde groups and ether groups, having a hydroxyl content of about 6%, having a melting point of 234° to 239° F., a specific gravity 1.218 and an acid number of 93. The resin is produced by Hercules Powder Company and is said to be a gasoline insoluble, aromatic hydrocarbon soluble resinous extract of pinewood. Phenol-aldehyde resins, preferably thermosetting, have also been found effective. Rosin derivatives including the pentaerythritol esters of rosin have been found useful particularly in combination with other resins such as "Vinsol." Two or more of these resins may be combined to obtain improved characteristics. In particular it has been found that Vinsol resin and from a small amount of the pentaerythritol ester of rosin up to a weight equal to that of the Vinsol cooperate to form a particularly tough, firmly adherent coating layer in which the butadiene acrylonitrile copolymer and the two resins are firmly joined together.

Aqueous dispersions of these resins are readily formed by conventional means. For example the resins may be melted or dissolved in solvents and the molten or dissolved resin dispersed in an aqueous medium containing a wetting or dispersing agent such as one of the numerous synthetic sulfonated oil or sulfonated alkyl materials and a thickening agent such as an alkali caseinate such as sodium caseinate or ammonium caseinate.

The aqueous resin dispersion and the butadiene acrylonitrile latex are mixed together to form a uniform composition. On a solids basis, the composition may contain from 50 to 75% by weight of the butadiene acrylonitrile copolymer and from 15% to 30% by weight of the polar resin. Where Vinsol resin is used there may be included a weight of pentaerythritol ester of rosin up to an amount equal to the weight of the Vinsol resin. Useful compositions have been prepared which do not include the pentaerythritol ester of rosin, but significant improvement is obtained where as little as 5% of the ester of rosin based on the weight of the copolymer and resin mixture is included in the composition.

The butadiene acrylonitrile copolymer latex and dispersed resin composition is quite stable and may be coated by any of the conventional coating procedures on the resin sheet or other resin article to be adhered. Brushing, knife coating, and roller coating may be employed. No special precautions need be taken as regards thickness since the thickness of coating has not been found critical.

In the organic solvent solution coating composition it has been found that best results are obtained using about from 75% to 33%, preferably 67% of resin such as phenol aldehyde resin with from 25% to 67% of the butadiene acrylonitrile copolymer. These solutions may be applied in any conventional manner, such as by spraying.

The coating is dried either under atmospheric conditions or under accelerated drying conditions, and a tough coating is obtained which is strongly adherent to the resin sheet or other resin article. When thoroughly dried, the coating is non-tacky and the coated sheets are non-blocking, so that the coated sheet material may be conveniently packed and stored for future adhesive bonding to surfaces to be covered.

This coated sheet material may be bonded to almost any surface through proper choice of adhesives; but for efficient use of water base adhesives, the surface should be porous to permit escape of moisture. Wood, felted surfaces such as paper, building board, cement, and plaster surfaces represent the most important surfaces to which the coated sheet material has been adhered.

The surface to be protected is given a coating of water base adhesive. Conventional coating techniques are employed. Thus for laying resin tile on flooring as shown in Fig. 2, a comb spreader is used to form a ridged coating of a viscous linoleum cement. Plaster and cement surfaces may be given a heavy brush coating. The resin sheet material is pressed in place while the cement is still soft.

Water base adhesives such as animal or casein glues or lignin type linoleum adhesives possess marked advantages for use in application of the new coated sheet material. Starch paste or dextrin adhesives can also be used. These adhesives which are hydrophilic sols bond naturally to wood or other porous surfaces and naturally to the coating on the sheet material. In addition, these adhesives have a high initial tack and a rapid build up in viscosity. Where these adhesives are used, the resin sheet is held on the surface by the tackiness of the adhesive and for a short period can be smoothed and worked into position, or even removed and reapplied. The viscosity of the adhesive then builds up and will hold the resin sheet even against continuing stresses so that the finished covering is smooth and well fitting.

This is a particularly valuable advantage over known methods of adhering resin sheet. For example in the use of tacky pressure-sensitive adhesives such as asphaltic materials, crude or reclaim rubber or rubber and resin compositions, the bond is adversely affected by migration of plasticizer and the resin sheet itself shrinks or curls and becomes brittle as a result of loss of plasticizer. Also the resin sheet may be stained or discolored by these adhesives. Solution type adhesives such as a solution of a butadiene acrylonitrile copolymer and a vinyl resin in a ketone produce a permanent, non-staining bond, but since the solvent is also a solvent for the resin sheet, the solvent will be trapped in the resin sheet and cause distortion and swelling of the sheet. Even resin-adherent coatings deposited from butadient acrylonitrile copolymer latex, which are free from the above disadvantage, are subject to the disadvantage that the resin sheet material must be perfectly positioned when first applied since the resin sheet cannot be shifted after application.

The application method of the present invention by avoiding all the difficulties opens up new fields of utility for sheet resin coverings. Vinyl resin tile according to the present invention comprising approximately 1/8 inch thick plasticized vinyl chloride-vinyl acetate resin containing approximately 15% of dioctyl phthalate with the butadiene acrylonitrile copolymer and resin layer on their under surface may be applied to floors and walls with the same adhesives and techniques familiar to artisans accustomed to applying linoleum and without unpleasant or dangerous solvent fumes. Paper thin vinyl resin for covering walls or furniture is readily applied by the adhesives and techniques familiar to paper hangers without distortion, puckering or gaping joints, and since the material may be peeled off and reapplied to the still wet adhesive, excellent fitting can be obtained even to intricate surfaces.

The following examples are given only to aid in understanding the invention and it is to be understood that the invention is not limited to detail of the compositions, proportions or techniques set forth in the example.

*Example I.*—A resin emulsion was prepared by mixing together a solution of 40 parts by weight of a pentaerythritol ester of rosin ("Pentalyn A"), 10 parts of a petroleum solvent (Solvesso I) and 0.65 part by weight of oleic acid with 10 parts by weight of water containing 0.25 part by weight of potassium hydroxide. The resulting mixture was then combined with a caseinate solution comprising 38 parts by weight of water and 1.5 parts by weight of ammonium caseinate to form an emulsion.

The above emulsion was combined with 124 parts by weight of a 40% solids aqueous emulsion of a hard, brittle, dark colored thermoplastic resin derived from pinewood (commercial Vinsol resin emulsion) and 456 parts by weight of a 50% solids latex of a butadiene acrylonitrile copolymer comprising 33% by weight of acrylonitrile (Hycar OR-25 latex), a 1/8 inch thick tile of a resinous copolymer of about 92% vinyl chloride and the balance vinyl acetate plasticized with 15% of dioctyl phthalate was given a brush coat of the above composition and the coated tile was set aside to dry for 24 hours.

A wooden floor was then coated by means of a comb-type hand spreader with a water base lignin type commercial linoleum cement (Webtex) and the dry coated surface of the resin tile was pressed firmly against the cement. The tile was held in place by the cement immediately upon application but could be given small adjustments in position by pushing its edges.

The cement was permitted to dry thoroughly. One corner of the cement was then pried up with a chisel and the tile further peeled from the wood using pliers. As shown in Fig. 3 the bond between the dried resin-copolymer rubber coating and linoleum cement was so strong as to break away portions of the cement and surface layers of wood attached to it. In other areas, relatively long thick legs of stretched resin copolymer rubber material were formed between the dried coating on the resin tile and the dried linoleum cement.

*Example II.*—A solution was prepared comprising 13.5 parts by weight of a thermosetting phenol aldehyde resin (Monsanto resin 635) and 6.5 parts by weight of a copolymer of butadiene and acrylonitrile comprising 42% acrylonitrile (Hycar OR-15) in 80 parts by weight of methyl ethyl ketone.

A ⅛ inch thick tile of a resinous copolymer of about 92% vinyl chloride and the balance vinyl acetate plasticized with 15% of dioctyl phthalate was given a brush coat of the above composition and set aside to dry for 24 hours.

A wooden floor was then coated by means of a comb type spreader with casein glue and the dry coating on the surface of the resin tile was pressed firmly against the glue. The glue was then permitted to dry thoroughly, and developed a very strong bond between the wood and the tile.

*Example III.*—An emulsion of a pentaerythritol ester of rosin ("Pentalyn H") was prepared by the same procedure given in Example I for the preparation of an emulsion of "Pentalyn A" and this emulsion was combined with 680 parts by weight of a 50% solids latex of a butadiene acrylonitrile copolymer comprising 33% by weight of acrylonitrile (Hycar OR-25 latex) and 250 parts by weight of a 50% solids aqueous emulsion of a hard, brittle, dark colored, thermoplastic resin derived from pinewood (commercial Vinsol resin emulsion). A seven mil thick sheet of a resinous copolymer of about 92% vinyl chloride and the balance vinyl acetate plasticized with 30% of dioctyl phthalate was given a transfer roll coat of the above composition and the coated sheet was dried under infrared lamps.

Stiff cardboard of the type used for book covers was given a brush coat of book binders' adhesive (hot animal glue) and the coated surface of the resin sheet was pressed smoothly against the adhesive using a hand roller. The sheet was held in place at once, but could be peeled off and replaced or relocated. When the adhesive dried a strong permanent bond was obtained between the sheet of resin and the cardboard.

Having thus described our invention, what we claim as new and desire to secure by Letters Patent of the United States is:

1. The method of securing water-repellent plastic sheet material to a porous surface which comprises providing on a surface of said sheet a strongly adherent layer comprising a butadiene acrylonitrile copolymer rubber containing from 20% to 50% acrylonitrile and a highly polar resin containing phenolic groups and a radical selected from the group consisting of hydroxy and carboxy radicals, providing a coating of a water base hydrophilic sol adhesive on said porous surface, pressing said layer against said coating, and removing water from said coating to set the adhesive.

2. The method of securing water-repellent plastic sheet material to a porous surface which comprises coating a surface of said sheet with a mixture of a butadiene acrylonitrile copolymer latex of which the copolymer comprises from 20% to 50% acrylonitrile and an aqueous dispersion of a highly polar resin containing phenolic groups and a radical selected from the group consisting of hydroxy and carboxy radicals, removing water from said coating, providing a coating of a water base hydrophilic sol adhesive on said porous surface, pressing said dried coating against said water base adhesive and removing water from said adhesive to set the adhesive.

3. The method of securing water-repellent plastic sheet material of which the plastic is plasticized with an ester plasticizer to a porous surface which comprises coating a surface of said sheet with an organic solvent solution comprising a butadiene acrylonitrile copolymer rubber containing from 20% to 50% acrylonitrile, and a phenol aldehyde resin, removing solvent from the coating, providing a coating of a water base hydrophilic sol adhesive on said porous surface, pressing the coated surface of said sheet material against the coating on said porous surface, and removing water from said water base adhesive to set the adhesive.

4. The method of securing water-repellent plastic sheet material of which the plastic is plasticized with an ester plasticizer to a porous surface which comprises coating a surface of said sheet with an organic solvent solution comprising from 25 to 67 parts by weight of solids of a butadiene acrylonitrile copolymer rubber containing from 20 to 50% acrylonitrile and from 75 to 33 parts by weight of solids of a phenol aldehyde resin, removing solvent from the coating, providing a coating of a water base hydrophilic sol adhesive on said porous surface, pressing the coated surface of said sheet material against the coating on said porous surface, and removing water from said water base adhesive to set the adhesive.

5. The method of securing a waterproof sheet of vinyl resin plasticized with an ester plasticizer to a porous surface which comprises coating a surface of said sheet with a mixture of a butadiene acrylonitrile copolymer latex in which the copolymer contains from 20% to 50% acrylonitrile and an aqueous dispersion of a hard, brittle, dark colored, thermoplastic resin derived from pinewood and containing phenol, aldehyde and ether groups and having a specific gravity of 1.218, a melting point of 234° to 239° F. and an acid number of 93, removing water from said coating to provide a surface layer strongly adherent to said vinyl resin, providing a coating of a water base hydrophilic sol adhesive on said porous surface, pressing said dried layer against said coating and removing water from said coating to set the adhesive.

6. The method of securing a waterproof sheet of a polymer containing at least 80% vinyl chloride and the balance vinyl acetate and plasticized with an ester plasticizer to a porous surface which comprises coating a surface of said sheet with a coating composition comprising a mixture of a butadiene acrylonitrile copolymer latex in which the copolymer comprises from 20 to 50% acrylonitrile and an aqueous dispersion of a hard, brittle, dark colored, thermoplastic resin derived from pinewood and containing phenol, aldehyde and ether groups and having a specific gravity of 1.218, a melting point of 234° to 239° F. and an acid number of 93, said mixture comprising on a solids basis from 50% to 75% by weight of the butadiene acrylonitrile copolymer, and from 15% to 30% by weight of said dark colored resin, removing water from said coating to provide a strongly adherent layer on said resin, providing a coating of a water base hydrophilic sol adhesive on said porous surface, pressing said dried layer against said coating and removing water from said coating to set the adhesive.

7. The method of securing a waterproof sheet of a polymer containing at least 80% vinyl chloride and the balance vinyl acetate and plasticized with an ester plasticizer to a porous surface which comprises coating a surface of said sheet with a coating composition comprising a mixture of a butadiene acrylonitrile copolymer latex in which the copolymer comprises from 20% to 50% acrylonitrile and an aqueous dispersion of a hard, brittle, dark colored, thermoplastic resin derived from pinewood and containing phenol, aldehyde and ether groups and having a specific gravity of 1.218, a melting point of 234° to 239° F. and an acid number of 93, and a pentaerythritol ester of rosin, said mixture comprising on a solids basis from 50% to 75% by weight of the butadiene acrylonitrile copolymer, from 15% to 30% by weight of said dark colored resin and from 5% up to a weight equal to the weight of said dark colored resin of said pentaerythritol ester, removing water from said coating to provide a strongly adherent layer on said resin, providing a coating of a water base hydrophilic sol adhesive on said porous surface, pressing said dried layer against said coating and removing water from said coating to set the adhesive.

8. In a composite structure in which a covering sheet is firmly secured to a porous surface by a bonding layer comprising the dried residue of a water base hydrophilic sol adhesive, the combination of a water-repellent plastic covering sheet and a solvent free primer layer strongly adherent to said sheet and comprising a butadiene acrylonitrile copolymer rubber containing from 20% to 50% acrylonitrile and a highly polar resin containing phenolic groups and a radical selected from the group consisting of hydroxy and carboxy radicals, said primer layer providing a surface strongly bonding to said hydrophilic sol adhesive to hold said plastic covering sheet material firmly to said porous surface.

9. In a composite structure in which a covering sheet is firmly secured to a porous surface by a bonding layer comprising the dried residue of a water base hydrophilic sol adhesive, the combination of a covering sheet of waterproof vinyl resin plasticized with an ester plasticizer and a dry solvent-free primer layer strongly adherent to said sheet and comprising a butadiene acrylonitrile copolymer rubber containing from 20% to 50% acrylonitrile and a hard, brittle, dark colored, thermoplastic resin derived from pinewood and containing phenol, aldehyde and ether groups and having a specific gravity of 1.218, a melting point of from 234° F. to 239° F. and an acid number of 93, said primer layer providing a surface strongly bonding to said hydrophilic sol adhesive to hold said covering sheet material firmly to said porous surface.

10. In a composite structure in which a covering sheet is firmly secured to a porous surface by a bonding layer comprising the dried residue of a water base hydrophilic sol adhesive, the combination of a covering sheet of waterproof vinyl resin plasticized with an ester plasticizer and a dry solvent-free primer layer strongly adherent to said sheet and comprising a butadiene acrylonitrile copolymer rubber containing from 20% to 50% acrylonitrile and a phenol aldehyde resin, said primer layer providing a surface strongly bonding to said hydrophilic sol adhesive to hold said covering sheet material firmly to said porous surface.

References Cited in the file of this patent

UNITED STATES PATENTS

| Number | Name | Date |
|---|---|---|
| 2,459,739 | Groten et al. | Jan. 18, 1949 |
| 2,537,982 | Finn | Jan. 16, 1951 |

FOREIGN PATENTS

| Number | Country | Date |
|---|---|---|
| 569,666 | Great Britain | June 4, 1945 |

OTHER REFERENCES

Vinylite Plastics, Dec. 6, 1944 (pp. 11–13 relied on).